(12) United States Patent
Steiner

(10) Patent No.: US 7,473,087 B2
(45) Date of Patent: Jan. 6, 2009

(54) DEVICE FOR EXCHANGING AN EXTRUSION CYLINDER OF AN EXTRUDER

(75) Inventor: Richard Steiner, Rosstal (DE)

(73) Assignee: Leistritz Aktiengesellschaft, Nuremberg (DE)

( * ) Notice: Subject to any disclaimer, the term of this patent is extended or adjusted under 35 U.S.C. 154(b) by 0 days.

(21) Appl. No.: 11/206,941

(22) Filed: Aug. 17, 2005

(65) Prior Publication Data

US 2006/0040010 A1    Feb. 23, 2006

(30) Foreign Application Priority Data

Aug. 19, 2004   (DE) ................. 10 2004 040 186

(51) Int. Cl.
*B29C 47/08* (2006.01)
(52) U.S. Cl. .............. 425/135; 425/186; 425/188; 425/192 R
(58) Field of Classification Search ........ 425/135, 425/152, 186, 188, 190, 192 R, 205, 207, 425/208
See application file for complete search history.

(56) References Cited

U.S. PATENT DOCUMENTS

| | | | | |
|---|---|---|---|---|
| 3,408,694 A | * | 11/1968 | Matsuoka | 425/186 |
| 3,619,329 A | * | 11/1971 | Wright | 425/208 |
| 3,712,775 A | * | 1/1973 | Duker | 425/186 |
| 3,825,387 A | * | 7/1974 | Gilman | 425/182 |
| 4,234,298 A | * | 11/1980 | Spielhoff | 425/186 |
| 4,615,664 A | * | 10/1986 | Kolossow | 425/205 |
| 4,750,841 A | * | 6/1988 | Hicks | 366/79 |
| 4,778,370 A | | 10/1988 | Heindl et al. | 425/190 |
| 5,004,413 A | * | 4/1991 | Stopforth | 425/186 |
| 5,498,380 A | | 3/1996 | Sasaki | 264/39 |
| 5,542,838 A | * | 8/1996 | Wilhelm et al. | 425/186 |

FOREIGN PATENT DOCUMENTS

| | | |
|---|---|---|
| DE | 26 54 774 | 6/1978 |
| DE | 295 06 094 | 5/1995 |
| JP | 57 077541 | 5/1982 |
| JP | 58-102737 | 6/1983 |
| JP | 58 187323 | 11/1983 |
| JP | 6-262665 | 9/1994 |

* cited by examiner

Primary Examiner—Robert B. Davis
Assistant Examiner—Joseph Leyson
(74) Attorney, Agent, or Firm—Jordan and Hamburg LLP

(57) ABSTRACT

Device for exchanging an extrusion cylinder of an extruder, the extrusion cylinder consisting of several cylinder sections and at least one screw element, which is in the interior of the cylinder and is coupled with the driving unit of the extruder for the purpose of extruding, a frame-like carrier being provided, which carries the extrusion cylinder and over which the extrusion cylinder can be held at accommodating means, which are provided at the extruder, as well as at mobile transporting means, a movement mechanism being provided at the accommodating means and/or at the transporting means and enabling the extrusion cylinder to be moved in a direction perpendicular to the cylinder axis for exchanging the complete extrusion cylinder from the accommodating means to the transporting means and vice versa.

21 Claims, 10 Drawing Sheets

DEVICE FOR EXCHANGING AN EXTRUSION CYLINDER OF AN EXTRUDER

BACKGROUND OF THE INVENTION

The invention relates to a device for exchanging an extrusion cylinder of an extruder, the extrusion cylinder consisting of several cylinder sections and at least one screw element, which is in the interior of the cylinder and must be coupled with the driving unit of the extruder for the purpose of extruding.

Extruders are used for preparing and processing different materials, for example, for preparing paint master batches or for compounding processes, as well as for processing thermoplastic materials. Moreover, in almost all areas, smaller batch sizes ranging, for example, from 25 to 1002 kg increasingly also play a role. In view of an optimum working process and an optimum result of the process, a conversion of the extrusion cylinder together with the screw elements in this cylinder would be required when a product is change. This is associated with intensive cleaning of those parts of the cylinder or the screw, which can also be used for processing the new materials. A conversion requires complete dismantling of the extrusion cylinder, consisting of segmented cylinder sections and screw sections. This takes a very long time, usually 1 to 2 days, and is associated with a prolonged downtime of the extruder, which is uneconomic. In view of this, a compromise is usually made in that the extrusion cylinder construction and screw construction are selected, which represent a bearable compromise with regard to the processing and the product quality obtained. Dismantling is therefore no longer required and, instead, the equipment is merely cleaned very intensively. Nevertheless, downtimes of 6 to 12 hours are also customary in this case and are associated with possible decreases in product quality and throughput since an extrusion cylinder, optimally designed for the respective product, is not used in this case.

The invention is based on the problem of indicating a possibility, which enables at extruder to be converted significantly more quickly.

SUMMARY OF THE INVENTION

Pursuant to the convention, this problem is solved by indicating a quick-release device for an extrusion cylinder, which is distinguished in that a frame-like carrier is provided, which carries the extrusion cylinder and over which the extrusion cylinder can be held at accommodating means, provided at the extruder, as well as at mobile transporting means, a movement mechanism being provided at the accommodating means and/or at the transporting means and enabling the extrusion cylinder to be moved in a direction perpendicular to the cylinder axis for exchanging the complete extrusion cylinder from the accommodating means to the transporting means and vice versa.

The inventive quick-release device comprises a frame-like carrier, on which the complete extrusion cylinder, together with the complete screw element within it and, preferably also, the whole of the water supply, the power supply and the control piping and leads are set up. This means that the complete process unit, including all supply and control piping and leads, is provided at this standardized carrier, which is always the same for different cylinders set up on it. Pursuant to the invention, this carrier can be connected detachably with accommodating means on the extruder side as well as with transporting means, which are mobile with respect to the extruder, and can be handed over from the one to the other. For this purpose, a movement mechanism is provided at the accommodating means and/or at the transporting means and makes this transfer or the exchange of the whole process unit possible.

When there is a change in product and the supply and control piping and leads, the number of which is kept as small as possible and which preferably are bundled, have been detached from the central supply and control piping and devices, provided at the extruder, and after the screw element or elements is/are decoupled from the extruder driving mechanism, the whole of the extrusion cylinder can be transferred from the accommodating means to the transporting means, which have been made available. Subsequently, an extrusion cylinder, which has been assembled already previously and is designed optimally for the product that is now to be produced, is made available by way of the transporting means and handed over by the latter to the accommodating means, the carrier here also representing the exchange platform. After the transfer of the new extrusion cylinder to the accommodating means, it is only necessary to couple on the extrusion cylinder, that is, to connect the appropriate supply pipelines and leads with the central supplying devices and control devices and to couple the screw elements with the driving mechanism.

Evidently, because the whole of the extrusion cylinder is exchanged and the new exchange carrier, extrusion cylinder can already be set up previously on a standardized exchange carrier, a very rapid exchange of the process unit can take place, so that the change-over times of the order of 30 minutes and shorter are possible. This means that the downtime of the extruder is strikingly reduced in comparison with previously customary practices within the scope of a product change. This is particularly advantageous from an economic efficiency point of view. The possibility of setting up the new extrusion cylinder previously on the standard exchange carrier makes it possible, with great advantage, to pre-heat the extrusion cylinder already before it is set up, said that the time that elapses before the actual production of the new product can be commenced, can be reduced even further, since the extruder, after the new extrusion cylinder is coupled on, is ready for use immediately.

As described, the exchange between the accommodating means and the transporting means is accomplished over a movement mechanism, which, depending on the design, is suitable for transferring a very heavy process unit safely from one part to the other. In this connection, in a first inventive alternative, the accommodating means itself can be constructed movably for a movement of the extrusion cylinder perpendicular to its longitudinal axis from a first position, in which the extrusion cylinder with the screw elements is aligned in an extrusion direction, into a second position, in which the transfer to the transporting means takes place. This means that the accommodating means itself is moved as a whole. Alternatively to the above, an appropriate part of the accommodating means can also be movable in order to realize the movement mechanism.

The movement itself may be different in nature. It is conceivable to design the accommodating means itself or a part thereof to be pivotable about an axis, which is parallel to the cylinder axis. This means that the cylinders are exchanged by a sideways swiveling of the whole process unit towards the transporting means, which accepts the carrier, together with the process unit, during the swiveling motion or at the end of the swiveling motion. For this purpose, the pivotable seating means or the pivotable part has a shaft, which can be driven by a motor and forms the swiveling axis and at which at least two radial and essentially vertically aligned side walls are provided, at which the carrier can be held. A controlled swiveling operation therefore takes place here about only one swiveling axis. Alternatively, the swiveling operation can also be controlled by a hydraulically or pneumatically controlled cylinder.

Alternatively, it is conceivable that the accommodating means itself or a portion thereof can be pivotable perpendicularly to the cylinder axis over a parallelogram of rods with two shafts, which form a swiveling axis and at least one of which can be driven by a motor, at least two fastening fixtures for the carrier being provided at the rods. This configuration also permits sideways swiveling in order to transfer the carrier and the cylinder, however, only if two swiveling axes and one parallelogram of rods are used which, contrary to the single axis solution, permit sideways motion while, at the same time, the extrusion cylinder is constantly aligned horizontally.

Alternatively to the swiveling, it is also conceivable that the accommodating means itself or a part thereof can be displaced horizontally by a linear guiding system. In this case, a lifting device for the vertical movement of the accommodating means or of the part is provided in the region of the accommodating means itself or such a lifting device is provided at the transporting means and enables vertical movement of the extrusion cylinder, which is accommodated on the transporting means side. The lifting device, which may be provided, as described, either at the accommodating means or at the transporting means, is required in this case for the transfer or the acceptance of the carrier together with the cylinder. Depending on the arrangement of the lifting device, the accommodating means itself can be raised or lowered for the acceptance or transfer or the correspondingly movable part thereof or an arrangement of the lifting device at the transporting means of the carrier accommodating region there can be raised or lowered, in order to accept the carrier coming from the accommodating means or to transfer it to the accommodating means.

Embodiments were described above, for which the actual movement of the carrier together with the cylinder to the side takes place over a movement mechanism, which is realized at the accommodating means. Alternatively or additionally to the movement mechanism realized there, it is possible to provide a movement device at the transporting means for moving the extrusion cylinder relative to the accommodating means. If a movement device is used at the transporting means, it must be designed in such a manner, that complete transfer of the carrier together with the cylinder to the immobile accommodating means or an acceptance of a carrier together with cylinder from the accommodating means is possible. If appropriate movement mechanisms are provided at both parts, they act advantageously together.

The movement device, provided at the transporting means, advisably is a linear displacement device, which can be moved with respect to the accommodating means. If, for example, the accommodating means is pivotable, the displacement device on the transporting means runs under the carrier, after which the accommodating means is swiveled and deposits the carrier on the displacement device, after which the latter is retracted once again onto the transporting means. If the movement mechanism at the accommodating means also is a linear displacement system, both linear systems can engage one another in order to exchange the carrier. Advisably, at least one linear system, particularly that of the transporting means, can be moved by a lifting device, in order to accept or transfer the carrier. The height can also be adapted using this lifting device.

As described, the "old" extrusion cylinder can be dismantled in a first exchanging step and the "new" extrusion cylinder can be installed at the extruder in a second step by means of the inventive device. In order to be able to make this exchange as quickly as possible, it is advisable, if the transporting means has two mounts for an extrusion cylinder with, in each case, one or a common movement device. This means that the transporting means, moved to the extruder, carries the "new" extrusion cylinder in a first mount and, in a first step, accepts the "old" extrusion cylinder in the second mount, after which the "new extrusion cylinder can be taken directly from the first mount and transferred. In this connection, the two mounts may be disposed one behind the other in the longitudinal direction. In this case, the dismantled "old" extrusion cylinder would be brought over its carrier into the first mount, after which the transporting means is shifted manually or automatically until it is positioned correctly once again and the "new" extrusion cylinder can be transferred from the second mount. Alternatively, it is conceivable to dispose the two mounts one above the other and to configure them vertically movable for a positioning with respect to the accommodating means. A pasternoster-like vertical exchange operation is therefore realized here. Initially, the free mount moves into the transfer position and accepts the "old" extrusion cylinder, after which the whole mimicry moves downward, for example, and the second, upper mount with the "new" extrusion cylinder is moved into the transfer position.

Alternatively to using a transporting means with two mounts, it is, of course, also conceivable to construct the transporting means in the form of two separate transporting devices with, in each case, one mount, optionally with an assigned movement device, both transporting devices being movable separately with respect to the extruder.

A transporting means may, for example, the movable at floor level, being constructed like a cart and guided either on rolls or rails. Alternatively, it is also conceivable to move the transporting means suspended from an elevated guide preferably over a guide disposed at the ceiling or over an appropriately elevated steel construction with guide rails. The movement may be controlled manually or automatically.

If the screw shafts must be coupled over coupling sleeves attached to the drive unit, the accommodating means itself advisably can be moved for shifting the extrusion cylinder relative to the extruder for coupling or uncoupling the screw element in the extrusion direction or it has a shifting device, which makes such shifting possible. This enables the extrusion cylinder to be shifted in the extrusion direction until the screw shaft or shafts has or have been moved out of the coupling sleeves and the transmission connecting piece. If, on the other hand, the coupling sleeves can be moved, they can be shifted on the transmission shafts or the screw shafts until these are disengaged. In this case, the transmission flange is constructed to be "open", so that the sideways movement of the extrusions on the can be brought about without prior longitudinal displacement.

In case of a displacement mechanism, an electrically or pneumatically or hydraulically controlled cylinder is provided for this purpose and moves the accommodating means or the displacement device, which is guided appropriately, so that it can be displaced longitudinally. The movement is initiated, for example, by actuating a displacement key, which must be depressed continuously, until the end position, which makes a sideways movement possible, is assumed. This end position is recognized, for example, by a limit switch, which stops the further triggering of the cylinder.

In order to avoid that the carrier, together with the extrusion cylinder, carries out a sideways movement, no matter for what reason, already before it was moved out of its drive coupling into a free position, it is advisable if a locking device is provided at the accommodating means, which blocks a sideways movement of the longitudinally displaceable extrusion cylinder until a defined end position is reached. This locking device may, for example, be in the form of a peg or a bolt, which is carried in an appropriate guide, this bolt being released only when the end position is reached.

To secure the carrier together with the extrusion cylinder at the accommodating means and/or the transporting means, devices for fixing the carrier advisably are provided, especially in the form of clamping or click-stop holders or in the form of positively holding engagement holders. These fixing devices not only lock, but also determine the correct positioning of the carrier at the accommodating means or at the transporting means, since the devices are closed or can engage one another only when the carrier is positioned correctly.

In order to ensure that the transporting means is also positioned correctly with respect to the accommodating means, at least one sensor should be provided in order to determine the positioning of the transporting means with respect to the accommodating means, the transfer operation of the extrusion cylinder taking place as a function of the sensor signal. This sensor may be constructed, for example, as a probe, which is actuated when the transporting means is positioned correctly. A light barrier or the like is also conceivable. If the sensor gives the acquisition signal, the automatic exchange operation can take place, that is, this operation is enabled by the control system. If, for example, the accommodating means is swiveled for this purpose, the swiveling-away mechanism can be triggered only then by actuating a switch or the like or, in the presence of the sensor signal, the clamping or click-stop holding devices at the accommodating means or the transporting means are opened automatically over appropriately triggered actuating mechanisms, so that the carrier is released, etc.

In view of the fact that, pursuant to the invention, the complete process unit is exchanged and must subsequently be flanged on once again, it is necessary to align this unit accurately with respect to the transmission coupling for connecting the screw shaft or shafts. In order to make this possible, the extrusion cylinder, pursuant to the invention, is mounted with floating fit at the carrier, that is, the cylinder unit itself, with respect to the carrier fixed at the accommodating means, is movable in the x and y directions for aligning it so that it can be coupled on, as well as for being able to absorb the temperature-induced longitudinal expansions, which occur in operation. The floating fit mounting advisably is realized over two parallel plates, a first plate of which is fixed to the carrier and the second plate of which is connected with the extrusion cylinder and is movable with respect to the first plate, for example, over interposed balls. A locking element, which can be moved over a servo mechanism, is provided and can engage the plate at the extrusion cylinder in order to block its mobility when necessary. The extrusion cylinder is movable with respect to the carrier locked at the accommodating means and can therefore be shifted manually somewhat for the alignment. At the same time, a locking device is provided for blocking the mobility required during the exchange in order to avoid that the extrusion cylinder slips to one side with respect to the carrier as it is swiveled aside. Moreover, the locking element may be a bolt, which passes through an opening in the plate assigned to the extrusion cylinder and has a clamping section, the diameter of which matches essentially that of the opening, and a release section, the diameter of which is correspondingly less. In the unlocked position, the release section of the bolt is positioned in the opening and, in the locked position, the clamping section, the bolt being advisably moved from the one position to the other by an electrically or pneumatically controlled control element cylinder.

Further advantages, distinguishing features and details of the invention arise out of the examples, described in the following as well as from the drawings.

DESCRIPTION OF THE PREFERRED EMBODIMENTS

Figure 1:
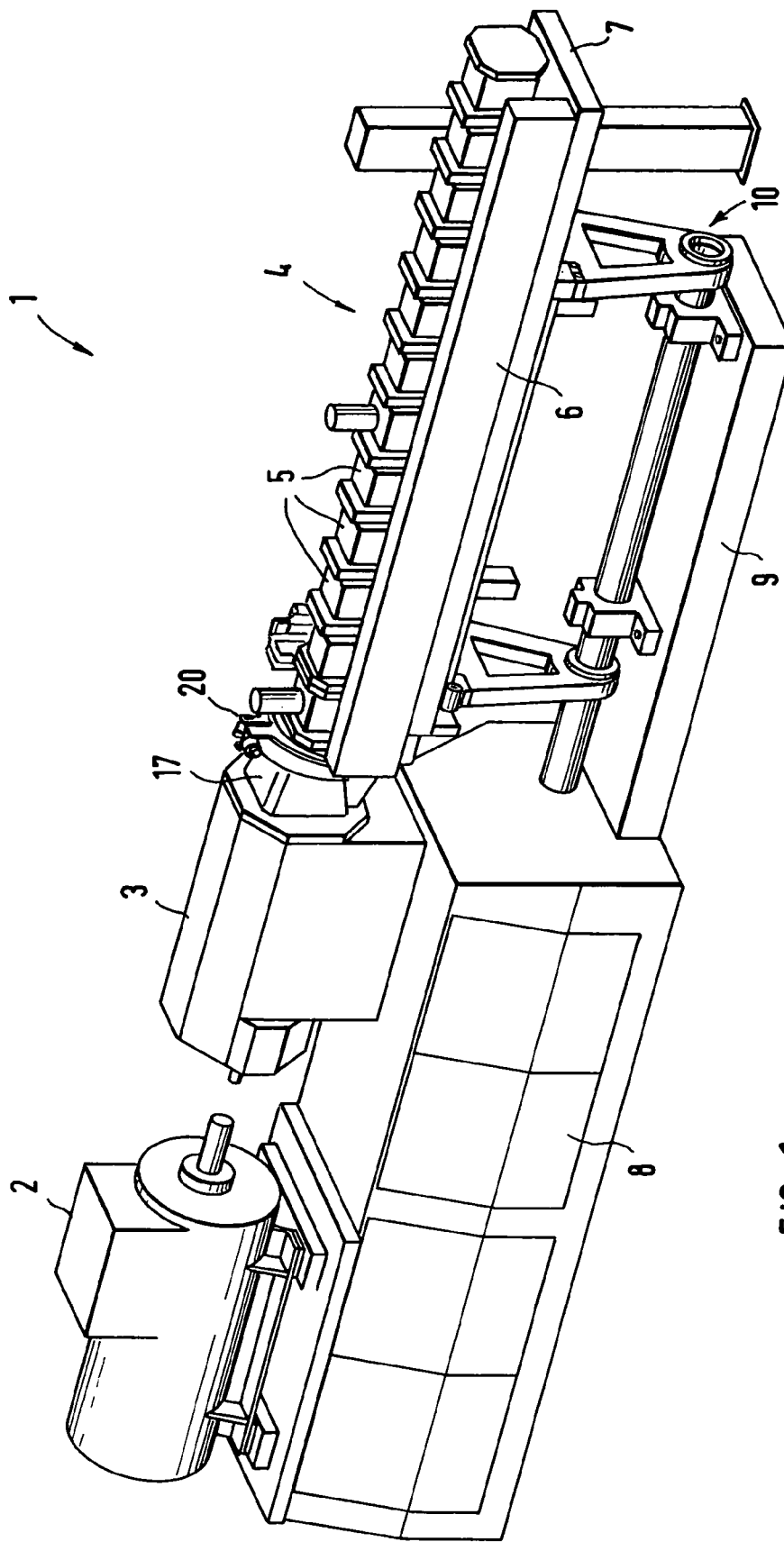
FIG. 1 shows a diagrammatic representation of an extruder with an extrusion cylinder, which is completely exchangeable.

FIG. 1 shows an extruder 1 with a motor 2, downstream from which there is a transmission 3, and an extrusion cylinder 4, consisting of several cylinder sections 5, in the interior of which, in the example shown, to screw elements are accommodated in appropriate boreholes. The screw elements are driven by the transmission 3, with which they are coupled by a coupling, the details of which are not shown but which is, however, adequately well known. Together with all cooling agent pipelines, power leads and control leads, which are placed in an appropriate mounting box 6, the extrusion cylinder 4 is set up on a frame-like carrier 7, which is a quasi standardized component, that is, each of the extrusion cylinders, which can be connected to the transmission 3, is set up on such an identically constructed carrier. The pipelines and leads, which are placed in the pipeline and leads box 6, are controlled, designed or coupled so that the least possible number of connections have to be made with the cooling agent and power supply facilities as well as the control devices in the supply and control cabinets 8. Preferably, only one cooling agent connection, one power supply connection and one control the connection are provided. This means that the extrusion cylinder 4 can be connected over only three plug-and-socket connections with the resource systems. The details of any attachments, disposed at the cylinder, such as metering devices or side-feeding devices for supplying material, are not shown. These must be dismantled before the cylinder is exchanged.

Figure 2:
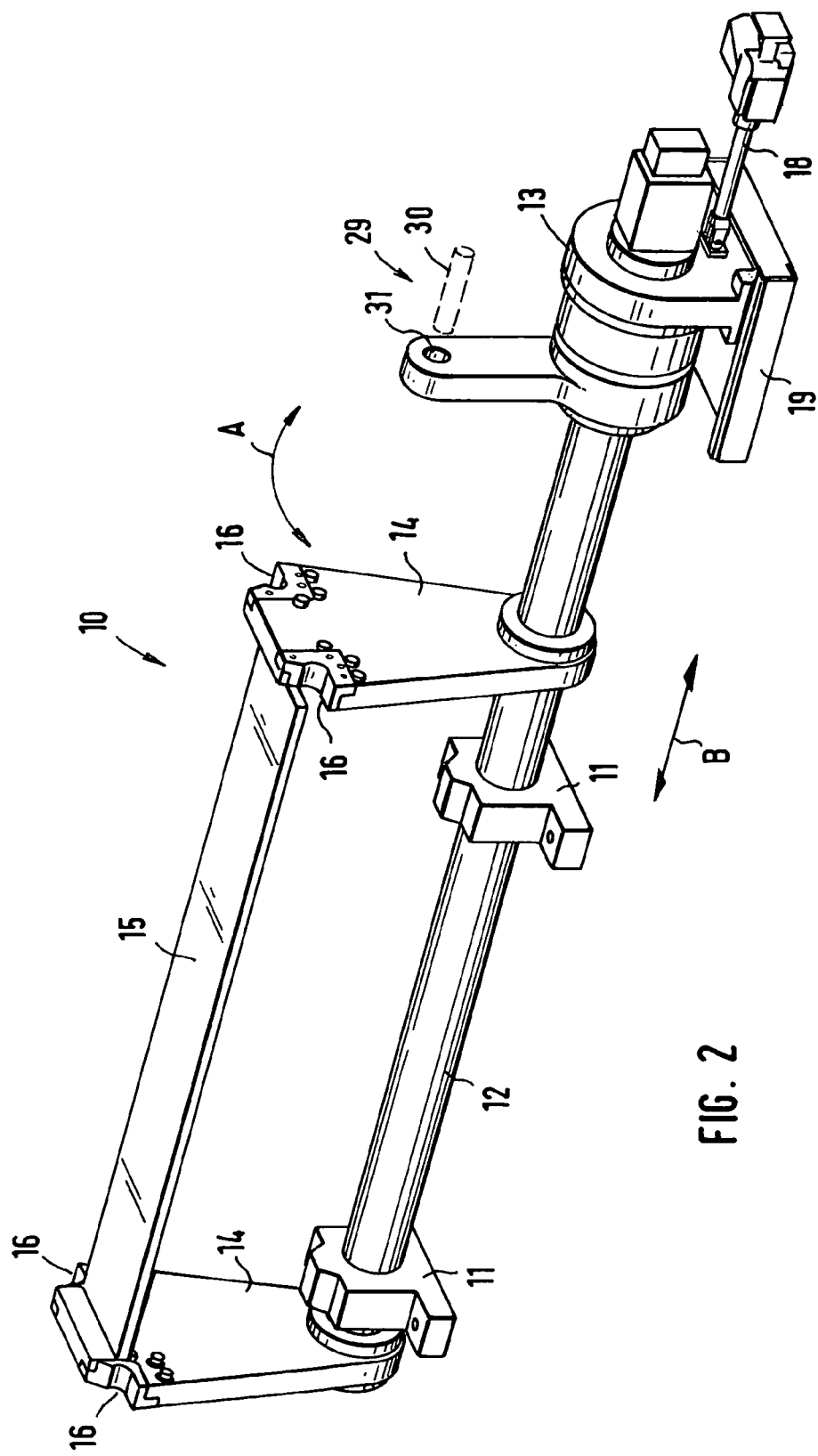
FIG. 2 shows a detailed representation of a pivotable accommodating means at the extruder of FIG. 1 for the carrier together with the extrusion cylinder.

The carrier 7 is seated on accommodating means 10 disposed at the machine frame 9 of the extruder 1. This accommodating means 10, the details of which are shown in FIG. 2, consists of a shaft 12, which is guided in two bearings 11, and can be driven by a motor 13. In the example shown, two side walls 14 are provided at the shaft 12, protruding radially and vertically from it. For stabilizing reasons, they are connected with one another by intermediate members 15. At the upper end of the side walls, positive catches 16 are provided, which interact with corresponding catch sections of the carrier 7. This will be described in the following. The carrier 7 therefore is taken up detachably on the side walls 14 by way of the catches 16. Because the shaft 12 is rotatable, the side walls 14 and, with them, also the seated carrier 7 together with the extrusion cylinder 4, can be swiveled, as indicated by the double arrow A.

For exchanging the extrusion cylinder 4, aside from the few supply and control connections, the two screw elements must be released from their driving coupling with the transmission 3. For this purpose, it may be necessary to move the extrusion cylinder 4 in the extrusion direction, in order to move the screw shafts out of the couplings and the transmission connecting piece 17. For this purpose, a pneumatic or electric cylinder 18 is provided, which is attached to the machine frame on the one hand and the transmission 13 on the other. The transmission 13 is mounted by its base plate 19 at the machine frame, so that it can be moved longitudinally. On the other hand, the shaft 12 is mounted so that it can be pushed through the bearings 11. By triggering the cylinder 18, it thus becomes possible to move forwards and backwards the whole of the accommodating means 10 together with the extrusion cylinder 4 in the direction of the double arrow B and thus to loosen the drive coupling.

Figure 3:
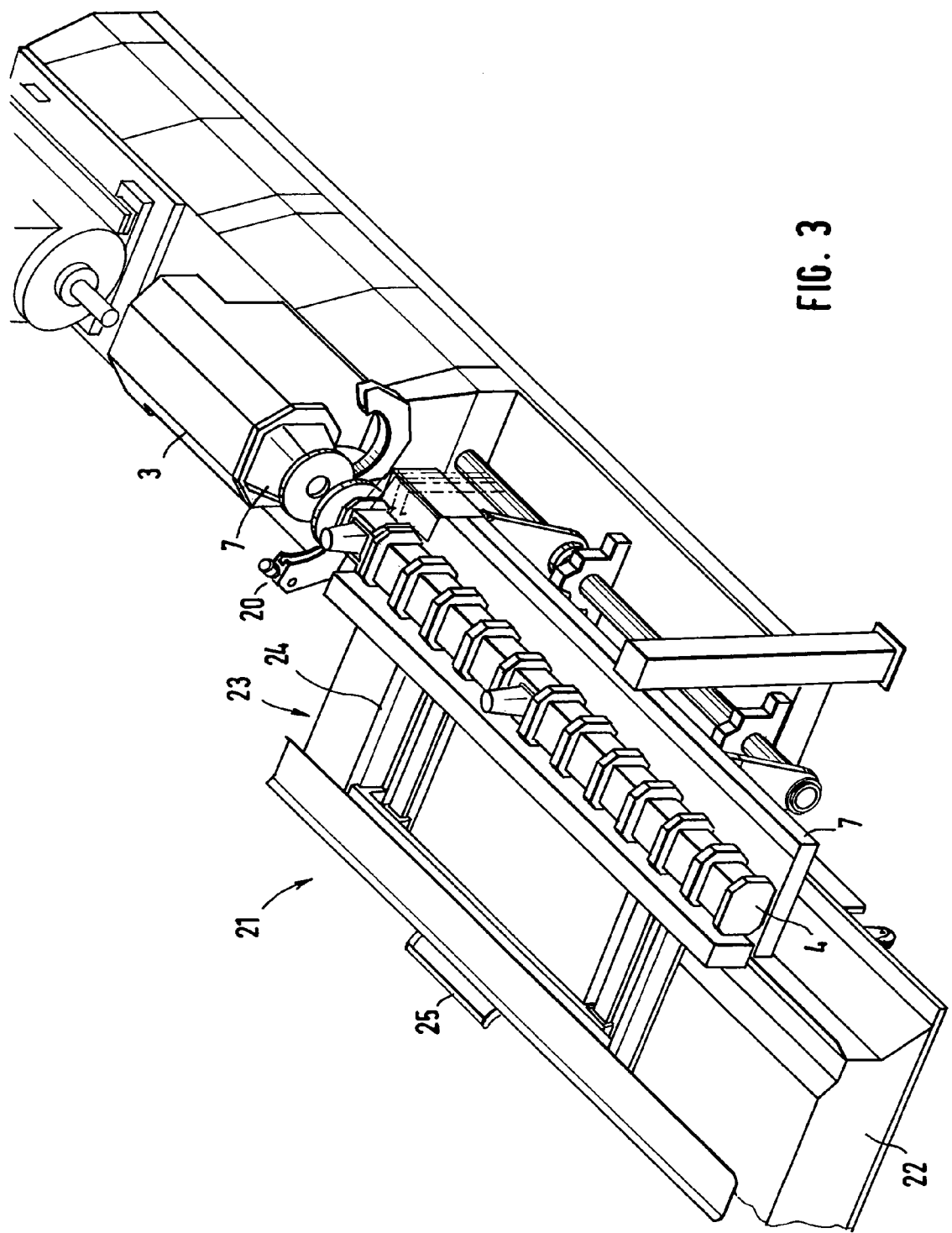
FIG. 3 shows a representation of the extruder of FIG. 1 with the carrier at the extrusion cylinder, which is moved for the transfer, and the excepting transporting means in the form of a transport cart.
Figure 4:
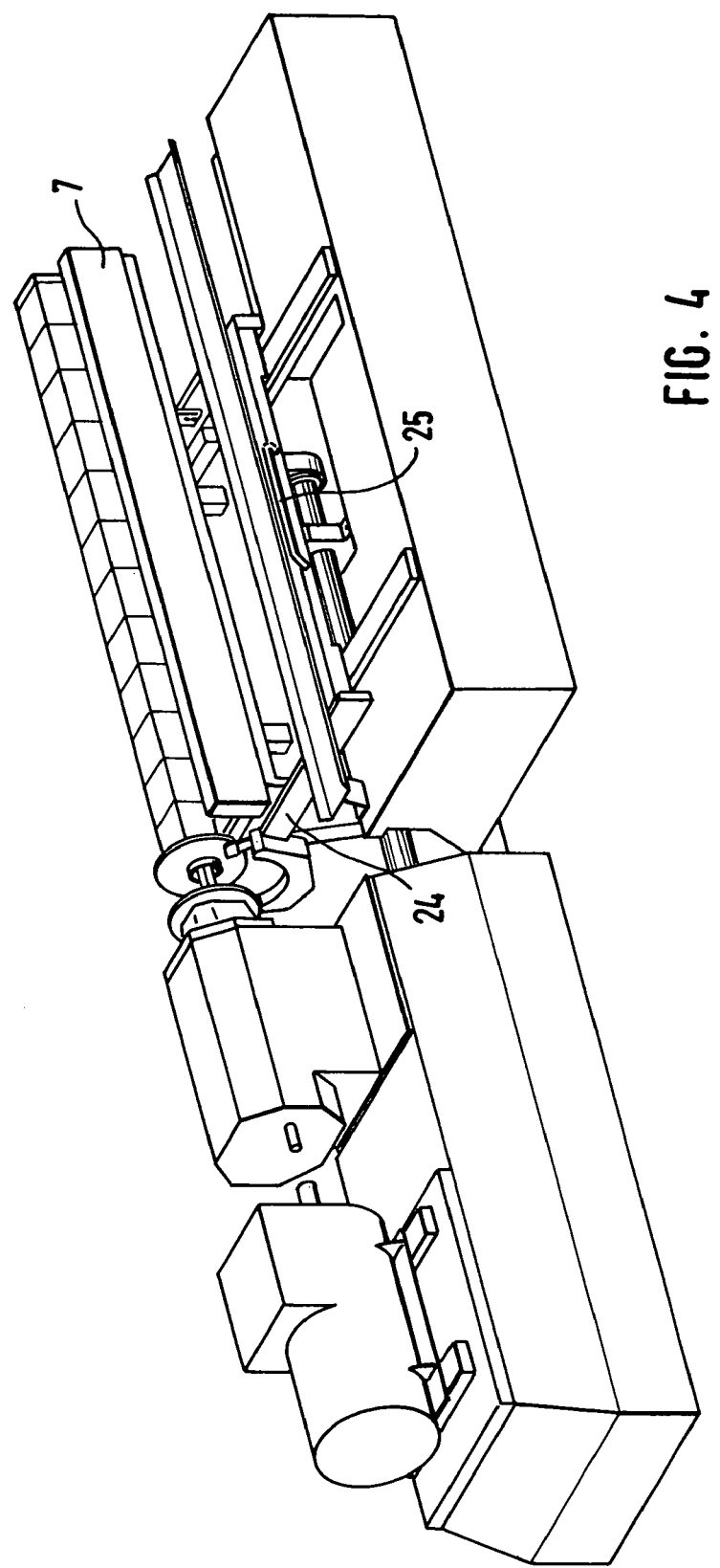
FIG. 4 shows the equipment of FIG. 3 with the linear shifting device moved by the transporting means under the carrier.

This situation is shown in FIG. 3, in which the opened clamping flange 20, which is shown in the closed form in FIG. 1, is shown. This clamping flange 20 must be opened for shifting the extrusion cylinder in the extrusion direction, that is, for uncoupling. Likewise, it is necessary to open the clamping screws (the details of which are not shown) at the coupling sleeves of the screw shafts, to which access may be gained by opening the transmission connecting piece 17. If now the extrusion cylinder is uncoupled mechanically as well as with respect to its supply and control systems, it can be shifted by triggering the cylinder 18 into the position shown in FIG. 3. Adjacent to the extruder 1, there is the transporting means 21 in the form of a cart 22, which can be moved manually here at floor level on rolls. At the top of the transporting means 22, a movement device 23 in the form of a linear displacement device 24 is provided which can be shifted manually by means of the handle 25 with respect to the accommodating means 10 and, with that, the extrusion cylinder 4. The linear displacement device 24 is now pushed under the carrier 7 of the extrusion cylinder, that is, the carrier 7 is undercrossed, as shown in FIG. 4

Figure 5:
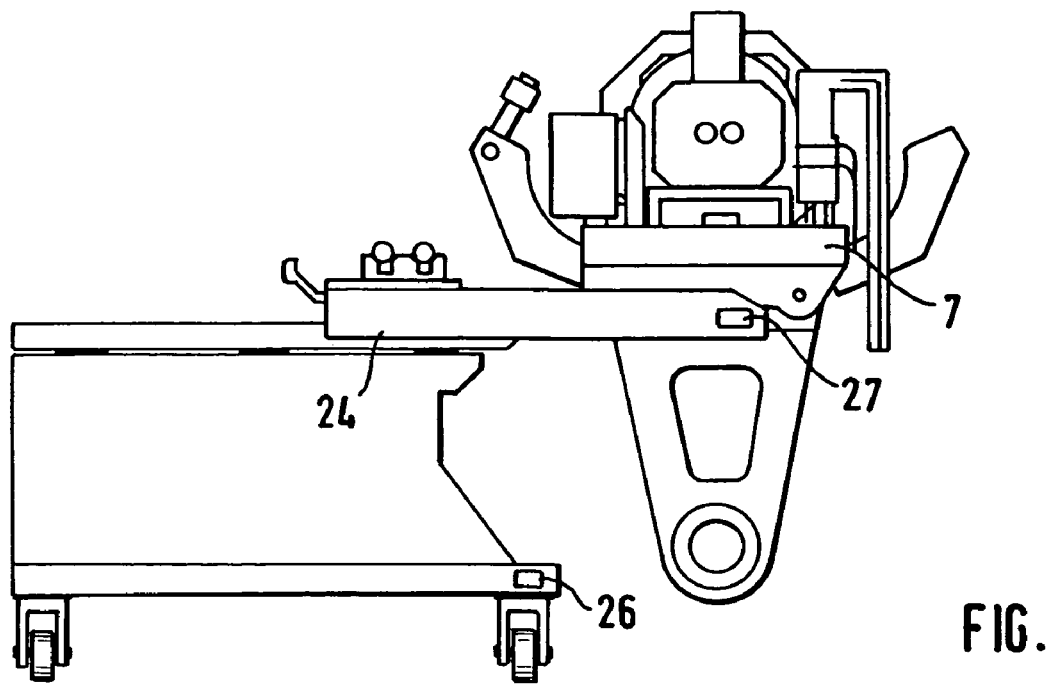
FIGS. 5-8 show diagrammatic views representing the transfer of the carrier together with the extrusion cylinder from the pivotable accommodating means to the shifting device of the transporting means, FIGS. 9 + 10 show representations of the floating-fit mounting of the extrusion cylinder with respect to the carrier.

This situation is seen in the form of a front view in FIG. 5, in which only the essential elements, necessary for representing the quick-release device, are shown. It is evident that the linear displacement device 24 takes hold of the carrier 7 from below.

Figure 6:
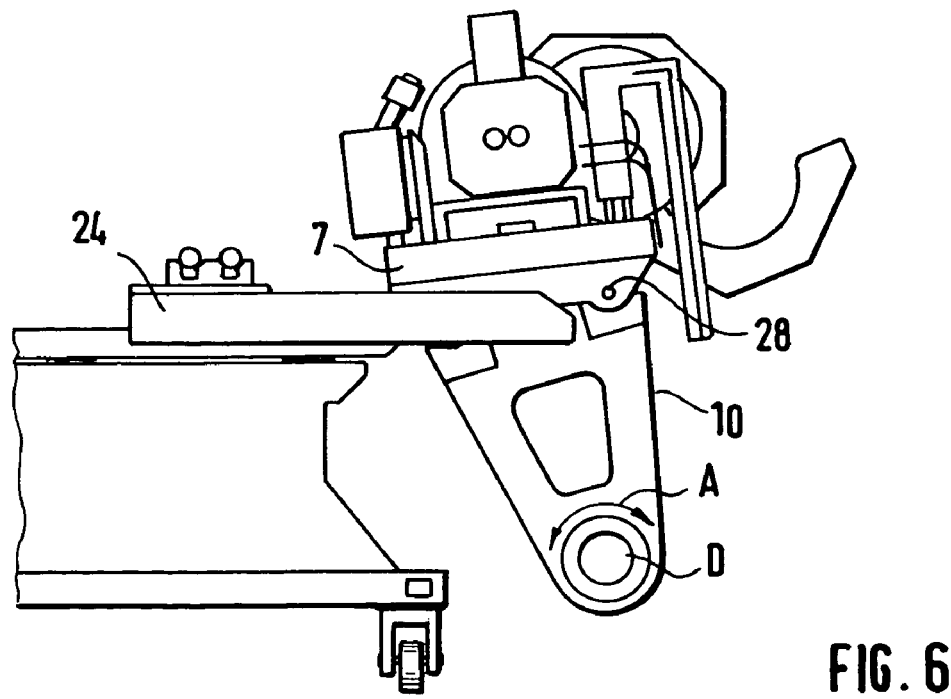
Figure 7:
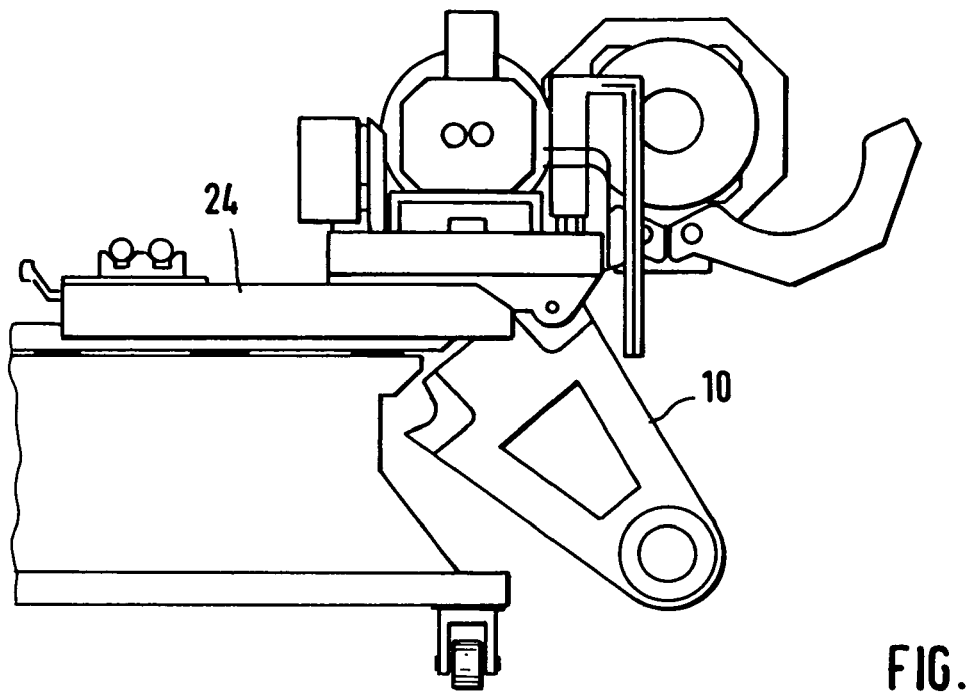
Figure 8:
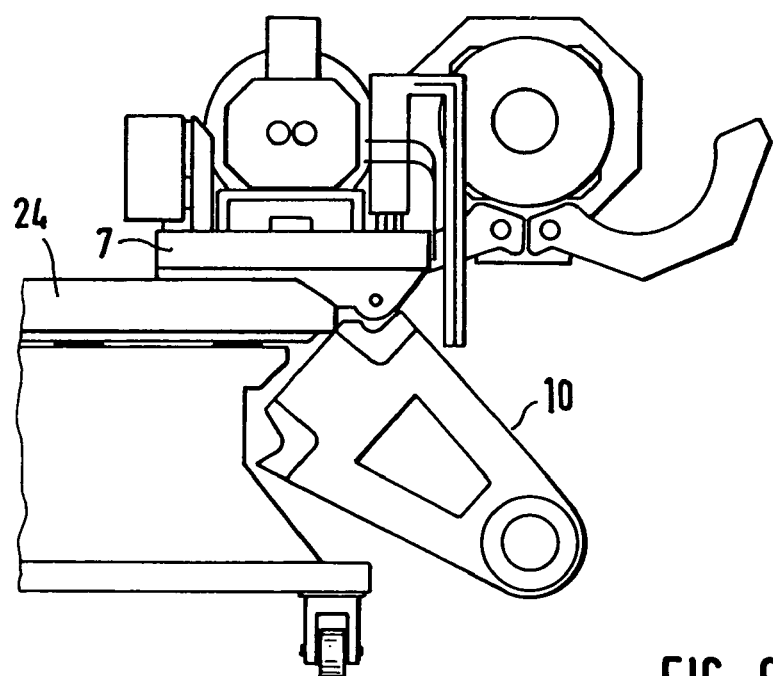

After a first signal with respect to the correct positioning was given, for example, by a first sensor element 26, which is shown here at the transporting means and which, when the transporting means 1 is positioned correctly with respect to the accommodating means 10, is actuated by an appropriate actuating part, such as a pin or the like in the accommodating means 10 or at the machine frame and after, for example, by a second sensor element 27, which is disposed in the example shown at the front end of the displacement device 24 and is actuated automatically, when the displacement device 24 is in the correct acceptance position, here also the correct positioning is signaled, the transfer operation can take place. For this purpose, a corresponding actuating switch is operated by a machine operator. By these means, the motor 13 is started, which now swivels the shaft 12 and therefore the accommodating means 10. The movement path is shown in FIGS. 6 to 8. It is evident that the accommodating means 10 are swiveled about the axis of rotation D, which is formed by the shaft 12, as indicated by the double arrow A. as the swiveling continues, the carrier 7 approaches the linear displacement device 24, until it rests upon the latter. This position is shown in FIG. 7. With a further swiveling movement of the accommodating means, the linear displacement device 24 is pushed back automatically onto the transporting means 21, until the carrier 7 is released completely by the accommodating means 10, after which the displacement device 24 is completely pulled back manually. With that, the carrier 7, together with the extrusion cylinder 4 and all supply piping and leads, etc., has been transferred completely from the accommodating means 10 to the transporting means 21.

For flange-mounting a "new" extrusion cylinder, the transporting means 21 with the "old" extrusion cylinder is now transported away and a further transporting means is brought along, on the linear displacement device 24 of which an extrusion cylinder, which is to be mounted and is set up on an identical carrier, is disposed. The transfer takes place in the reverse number. To begin with, the transporting means must be positioned correctly once again, which can be detected at least by the sensor 26 on the transporting means. Subsequently, the linear displacement device is moved forward as far as possible up to the first engagement of the carrier 7 with the accommodating means 10. Thereupon, the accommodating means 10 is swiveled back once again by starting the motor 13 and, at the same time, the carrier 7, together with the extrusion cylinder of 4, is taken along. The swiveling motion takes place until the end position, shown in FIG. 5, is reached. The linear displacement device 24 can now be moved back once again and the transporting means 21 is transported away. Subsequently, the extrusion cylinder need only be moved back counter to the extrusion direction into the coupling-on position by triggering the cylinder 18. The mechanical coupling to the drive must now still be established and the supply piping and control leads connected, after which the operation can commence immediately.

As can be seen in FIGS. 5 to 8, appropriate catching projections 28 are provided at the underside of the carrier and engage the catches 16 on both side walls 14. The shape of the catching projections 28 corresponds to the shape of the catches 16, so that these can engage one another positively. Moreover, the carrier 7, together with the set up is attached to the accommodating means 10 and the possibility of pushing the displacement device 24 back automatically is realized during the swiveling motion.

In FIG. 2, a locking device 29 furthermore is shown, which consists here of a bolt 30, which is drawn by broken lines here and located at the machine frame, and of an opening 31, which is provided at a part of the transmission 13 and serves to accommodate the bolt 30. The arrangement is such that the bolt 30 remains in the bolt seat 31 until accommodating means 10, uncoupled during the displacement movement controlled by the cylinder 18, has reached the end position, which can be detected by a suitable limit switch. Only then can the swiveling motion, which is previously blocked because of the bolt engagement, take place.

Figure 9:
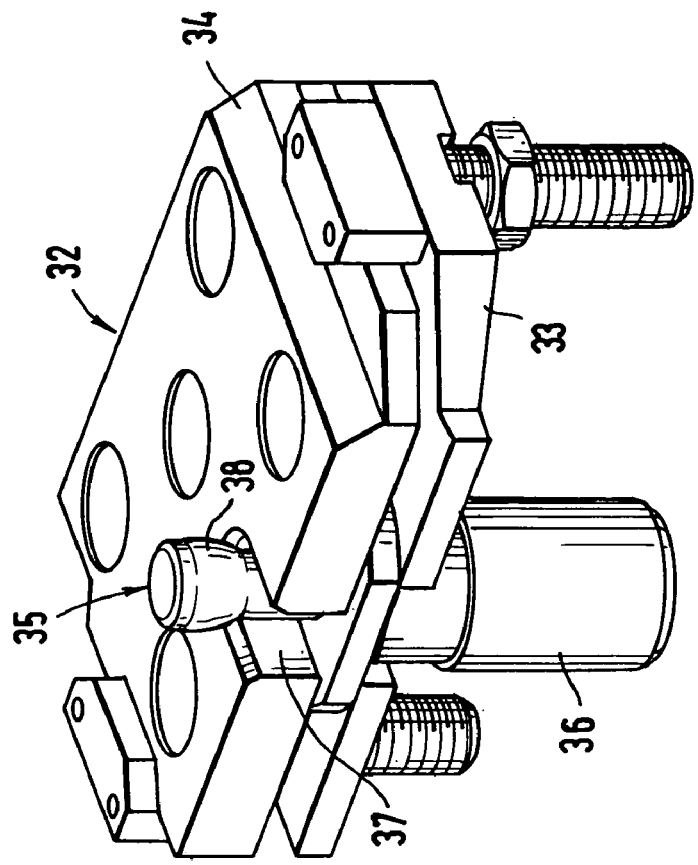
Figure 9:
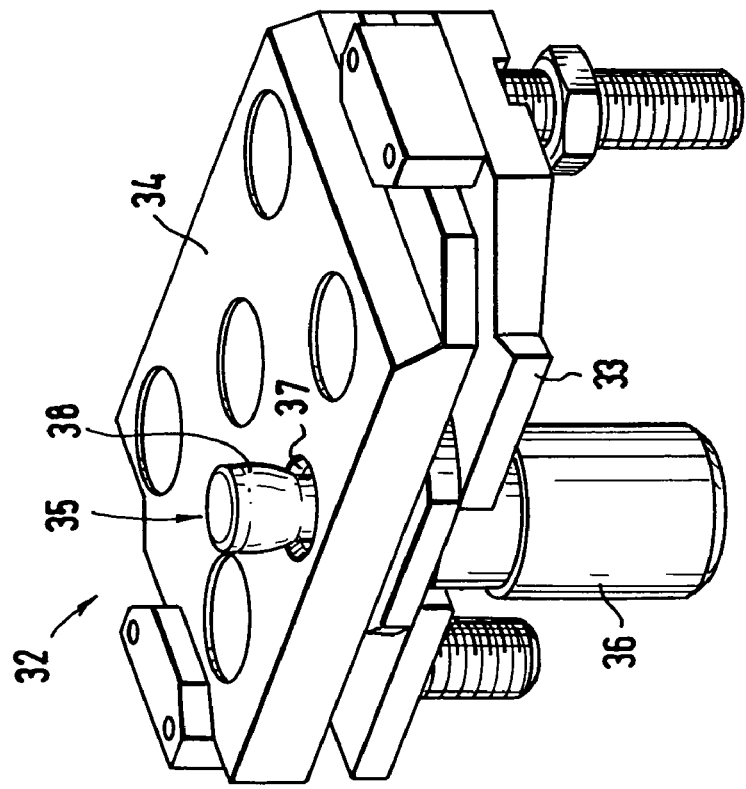
Figure 10:
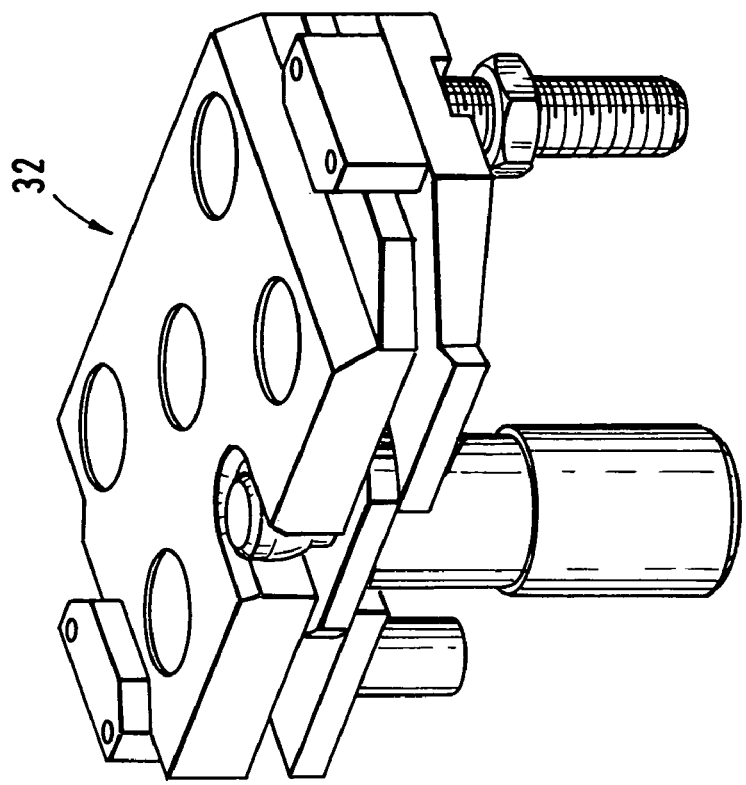
Figure 10:
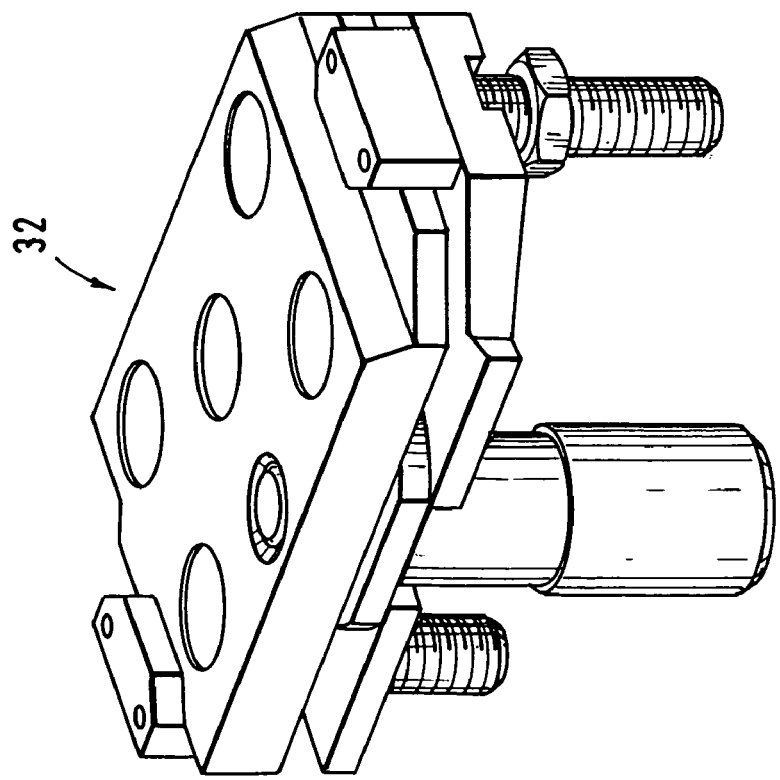

FIGS. 9 and 10 shows the floating mounting 32 over which the extrusion cylinder 4 is mounted movably with respect to the carrier 7. The extrusion cylinder is mounted at the front and rear end over two bearing units. Each floating bearing 32 comprises a first plate 33, which is fastened to the carrier 7, as well as a second plate 34, which carries the extrusion cylinder 4. Both plates 33, 34, floating with respect to one another, can be moved in a floating manner over balls, the details of which are not shown. This means that the extrusion cylinder 4 can be shifted with respect to the carrier 7. By these means, the extrusion cylinder can be aligned with the drive unit for the purpose of coupling the two. Likewise, it is also possible to compensate by these means for thermal expansion while the extrusion cylinder is being operated.

As shown in FIG. 9, each floating mounting 32 furthermore has a pin 35, which can be moved up and down by a control cylinder 36. In the position shown in FIG. 9, the pin 36 is extended. It passes through an opening 37, the section of the pin in the opening having a smaller diameter here than the opening. This means that the plates 34 can be moved in spite of the pin engagement. If the cylinder is to be transferred, it is necessary to lock it with respect to the carrier. For this purpose, the pins 35 can be pulled downward by the control cylinder 36. The upper end of the pin 35 has a clamping section 38, the diameter of which essentially matches the diameter of the opening 37 and which is pulled into the opening 37, so that the latter no longer has any clearance. The opening 37 of the bearing unit, which is the rear bearing unit in the extrusion direction, is slotted, so that the strong, thermally induced longitudinal expansions can be absorbed.

Figure 11:
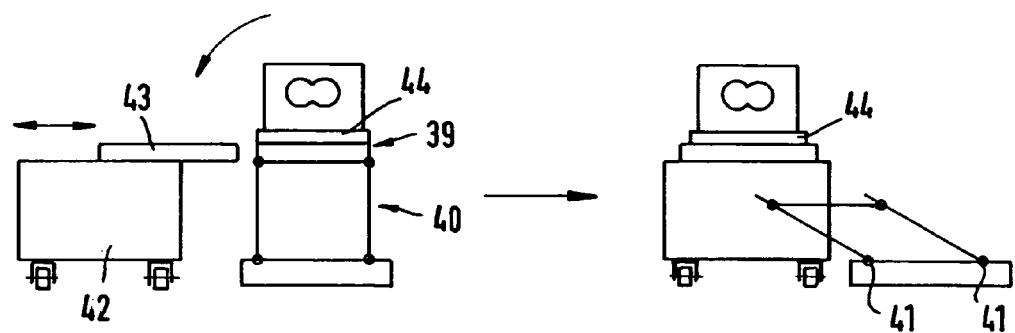
FIG. 11 shows a diagrammatic representation of a further movement mechanism, for which a parallelogram of rods is used.

FIG. 11 shows a further embodiment of an inventive movement mechanism for the accommodating means in the form of a diagrammatic sketch. The accommodating means 39, which is not shown in detail here, can be swiveled over a parallelogram of rods 40 about two separate axes 41, of which at least one can be given by a motor, the extrusion cylinder, as shown in FIG. 11, retaining a horizontal alignment during this swiveling motion. The transporting means 42, shown in FIG. 11, may be constructed similarly to the transporting means 21 of the previously described embodiment and also have a linear displacement device 43, on which the carrier 44 of the extrusion cylinder is deposited. With regard to the holding device for the carrier 44 at the accommodating means 39, appropriate sensors or locking elements or the length displaceability, etc., the comments above apply correspondingly.

Figure 12:
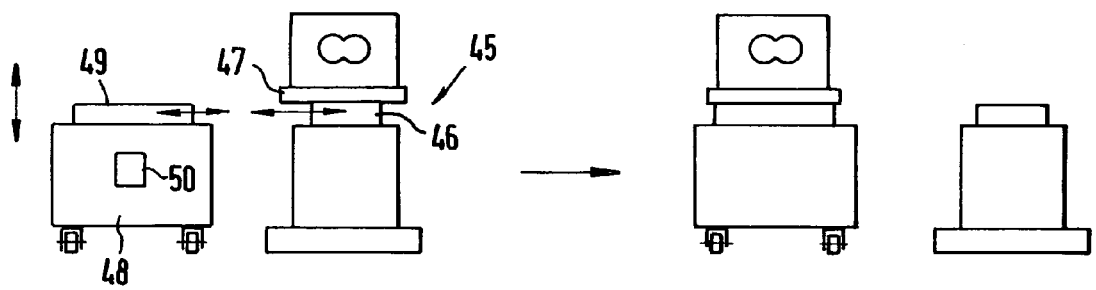
FIG. 12 shows a further embodiment of a movement mechanism using to linear guiding systems at the accommodating means and at the transporting means.

FIG. 12 shows a further embodiment of the accommodating means 45, which has a linear guiding system 46, which makes a horizontal displacement of the extrusion cylinder possible. Here also, the extrusion cylinder is held by way of a carrier 47 at the linear guiding system 46. The transporting means 48 here also has a linear displacement device 49. However, the latter can be moved vertically by a lifting device 50. For the exchange, after it is uncoupled and displaced longitudinally, the carrier 47, together with the setup, is, for example, moved ever the linear guiding system 46 in the direction of the transporting means 48, after which the linear displacement device 49, taking hold of the carrier 47 form below, is raised by the lifting device 50, takes up the carrier 47 together with the setup and subsequently is retracted once again, as illustrated in the end position shown at the right. A new extrusion cylinder is accepted correspondingly in a reverse sequence.

Figure 13:
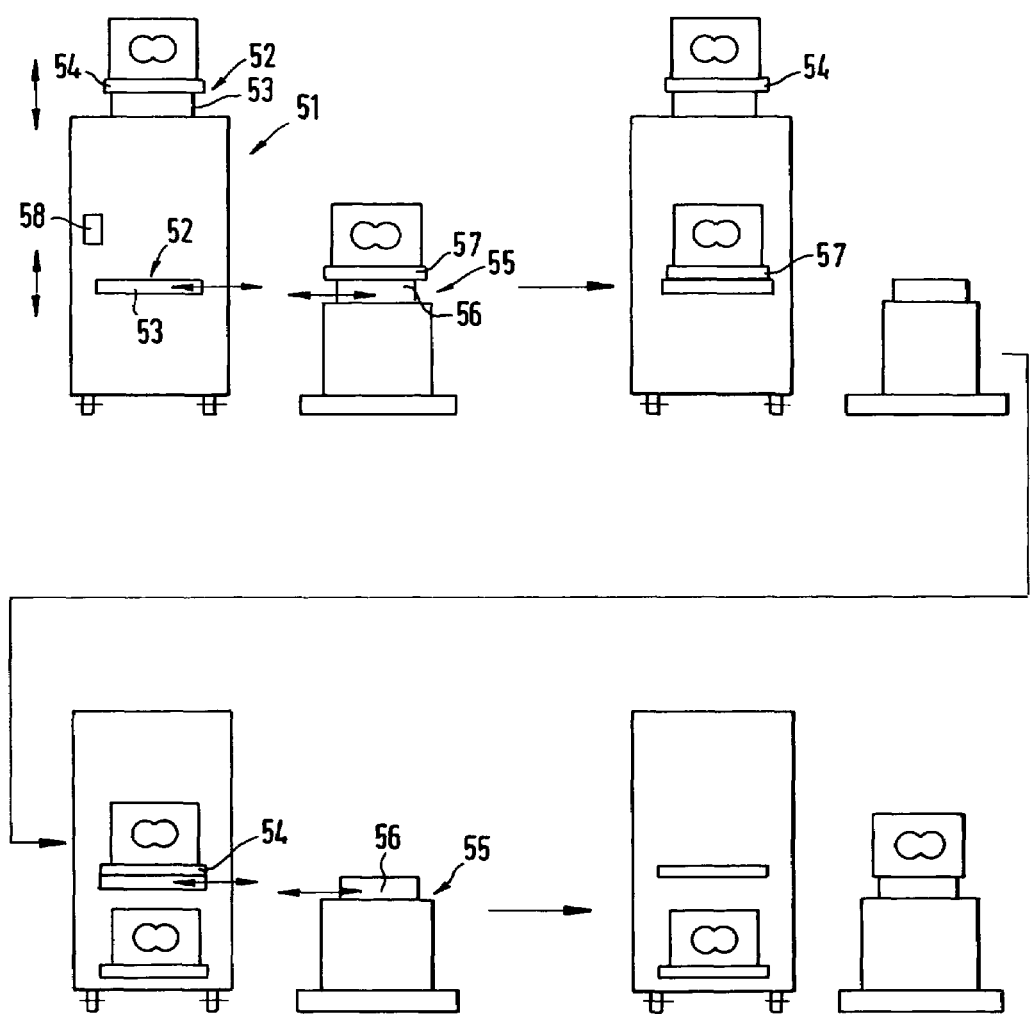
FIG. 13 shows a further embodiment of transporting means having two mounts, which are disposed vertically one above the other.

Finally, FIG. 13 shows a further inventive embodiment. Here the transporting means 51 has two mounts 52, which are formed by a linear displacement device 53 for, in each case, one extrusion cylinder set up on a carrier. For the exchange, the lower mount 52 is first of all positioned with respect to the accommodating means 55, which here also is in the form of a linear guiding system 56. In a first step, the carrier 57 is exchanged in the manner described from the linear guiding system 56 to the linear displacement device 53. This is shown in the second part in FIG. 13.

Subsequently the two mounts 52 are moved vertically downward by a central lifting device 58, until the upper mount 52 is aligned with respect to the accommodating means 55. Subsequently, the carrier 54 is changed over to the linear guiding system 56. It should be pointed out at this time that, instead of the linear guiding system 56, the swiveling version of the accommodating means, as described in FIGS. 1 to 8, can of course also be used.

In each case, the Figures have shown transporting means, which operate at floor level. Of course, the possibility exists of having suspended transporting means. Furthermore, instead of the two mounts that are disposed one above the other, as shown in FIG. 13, it is also possible to provide two mounts that are provided one behind the other.

The invention claimed is:

1. A device for exchanging an extrusion cylinder, comprising:
    an extruder including accommodating means carried on a structural support portion of the extruder;
    mobile transporting means movable independently of the extruder;
    an extrusion cylinder being comprised of cylinder sections and including at least one screw element which is in an interior of the extrusion cylinder and which is coupleable with a driving unit of the extruder for the purpose of extruding;
    a carrier being provided in a general form of a frame structure, said extrusion cylinder being carried on said carrier, said carrier being receivable to said accommodating means as well as to said mobile transporting means; and
    a movement mechanism operable for moving the extrusion cylinder in a direction perpendicular to a longitudinal cylinder axis of said extrusion cylinder for exchanging the extrusion cylinder and the attached carrier from the accommodating means to the transporting means and vice versa, said movement mechanism including a construction by which said accommodating means itself or a part thereof is mobile for moving the extrusion cylinder, and the accommodating means itself or the part thereof is swivelable about a swiveling axis parallel to said longitudinal cylinder axis.

2. The device of claim 1, wherein the accommodating means or the part thereof includes a shaft which forms the swiveling axis and which is drivable by a motor or by a hydraulically or pneumatically controlled cylinder, at least two side walls being provided on said shaft, said at least two side walls protruding radially and essentially vertically, at which the carrier can be held.

3. The device of claim 1, further comprising a movement device for moving the extrusion cylinder relative to the accommodating means provided at the transporting means.

4. The device of claim 3, wherein the movement device is a linear displacement device.

5. The device of claim 3, wherein the movement device can be moved vertically by a lifting device.

6. The device of claim 1, wherein the transporting means has two mounts for, in each case, one extrusion cylinder with, in each case, one or a common movement device.

7. The device of claim 6, wherein the two mounts are disposed one behind the other in the longitudinal direction.

8. The device of claim 6, wherein the two mounts are disposed one above the other and can be moved vertically for positioning with respect to the accommodating means.

9. The device of claim 1, wherein the transporting means comprises two separate transporting devices with, in each case, one mount with an assigned movement device.

10. The device of claim 1, wherein the transporting means is mobile at floor level or can be moved in a suspended manner at a guide, preferably disposed at the ceiling.

11. The device of claim 1, wherein the accommodating means itself can be moved for displacing the extrusion cylinder relative to the extruder for coupling or uncoupling the screw elements in the extrusion direction, or has a displacement device, which makes such a displacement possible.

12. The device of claim 11, wherein an electrically or pneumatically or hydraulically controlled cylinder is provided for such a displacement.

13. The device of claim 11, wherein a locking device is provided at the accommodating means and blocks a sideways movement of the extrusion cylinder, displaced longitudinally, until a defined end position is reached.

14. The device of claim 1, wherein devices for fixing a carrier are provided at the accommodating means and/or at the transporting means.

15. The device of claim 1, wherein at least one sensor for detecting the positioning of the transporting means with respect to the accommodating means is provided, a transferring operation of an extrusion cylinder taking place as a function of a sensor signal provided by said at least one sensor.

16. The device of claim 1, wherein the extrusion cylinder is mounted in a floating manner at the carrier.

17. The device of claim 16, wherein the floating-fit mounting is realized over two plates, of which a first plate is fixed to the carrier and the second plate is connected with the extrusion cylinder and is movable with respect to the first plate, a locking element, which can be moved by a servo mechanism, being provided and can be brought into engagement with the plate at the extrusion cylinder in order to block its mobility when necessary.

18. The device of claim 17, wherein the locking element is a bolt, which passes through an opening in the plate assigned to the extrusion cylinder and has a clamping section, the diameter of which matches essentially that of the opening, and a release section, the diameter of which is correspondingly smaller, it being possible to position the bolt with the release section in the opening in an unlocked position and with the clamping section in the opening in a locking position.

19. The device of claim 17, wherein the actuating mechanism is an electrically or pneumatically controlled cylinder.

20. The device of claim 14, wherein said devices for fixing a carrier are provided in a form of clamping or click-stop holders or in the form of positively holding engagement holders.

21. The device of claim 1, wherein the accommodating means itself or the part thereof can be swiveled perpendicularly to the longitudinal axis of the cylinder by a parallelogram of rods with two shafts, each of which forms a swiveling axis and of which at least one can be driven by a motor, and at which rods of at least two holding devices for the carrier are provided.

* * * * *